US012696147B2

(12) United States Patent  
Elmali et al.

(10) Patent No.: US 12,696,147 B2  
(45) Date of Patent: Jul. 28, 2026

(54) CONFIGURATION OF SUCCESSFUL PRIMARY SECONDARY CELL CHANGE REPORT

(71) Applicant: Nokia Solutions and Networks Oy, Espoo (FI)

(72) Inventors: Ugur Baran Elmali, Munich (DE); Irina-Mihaela Balan, Munich (DE); Guillaume Decarreau, Munich (DE); Ahmad Awada, Munich (DE); Bernhard Wegmann, Munich (DE)

(73) Assignee: Nokia Solutions and Networks Oy, Espoo (FI)

( * ) Notice: Subject to any disclaimer, the term of this patent is extended or adjusted under 35 U.S.C. 154(b) by 285 days.

(21) Appl. No.: 18/467,372

(22) Filed: Sep. 14, 2023

(65) Prior Publication Data

US 2024/0107390 A1 Mar. 28, 2024

(30) Foreign Application Priority Data

Sep. 27, 2022 (GB) .................................... 2214099

(51) Int. Cl.  
*H04W 36/00* (2009.01)

(52) U.S. Cl.  
CPC .............................. *H04W 36/0061* (2013.01)

(58) Field of Classification Search  
USPC ....................................................... 370/331  
See application file for complete search history.

(56) References Cited

U.S. PATENT DOCUMENTS

| | | | |
|---|---|---|---|
| 2021/0258852 A1 | 8/2021 | Selvaganapathy et al. | |
| 2021/0314826 A1 | 10/2021 | Chang et al. | |
| 2022/0038968 A1 | 2/2022 | Latheef et al. | |
| 2024/0306048 A1* | 9/2024 | Wang .................... | H04W 24/02 |
| 2025/0088916 A1* | 3/2025 | Zeng .................... | H04W 36/305 |
| 2025/0106753 A1* | 3/2025 | Chang .................... | H04W 48/08 |
| 2025/0159516 A1* | 5/2025 | Krishnan ............ | H04W 36/328 |
| 2025/0184836 A1* | 6/2025 | Wu .................... | H04W 36/0061 |
| 2025/0193760 A1* | 6/2025 | Yan .................... | H04W 36/305 |

(Continued)

FOREIGN PATENT DOCUMENTS

| | | |
|---|---|---|
| CN | 115004764 A | 9/2022 |
| WO | 2021/056465 A1 | 4/2021 |
| WO | 2021/097627 A1 | 5/2021 |

(Continued)

OTHER PUBLICATIONS

"3rd Generation Partnership Project; Technical Specification Group Radio Access Network; NR; NR and NG-RAN Overall Description; Stage 2 (Release 17)", 3GPP TS 38.300, V17.0.0, Mar. 2022, pp. 1-204.

(Continued)

*Primary Examiner* — Gregory B Sefcheck  
*Assistant Examiner* — Majid Esmaeilian  
(74) *Attorney, Agent, or Firm* — Barta Jones, PLLC

(57) ABSTRACT

Embodiments of the present disclosure relate to devices, methods, apparatuses and computer readable medium of a configuration of successful primary secondary cell (PSCell) change report. The method comprises obtaining information associated with a SPCR; and determining a configuration of the SPCR based at least partly on the information.

13 Claims, 6 Drawing Sheets

100

(56) References Cited

U.S. PATENT DOCUMENTS

| | | | | |
|---|---|---|---|---|
| 2025/0203436 A1* | 6/2025 | Geng | .................. | H04W 24/10 |
| 2025/0374139 A1* | 12/2025 | Chang | .................. | H04W 36/00 |

FOREIGN PATENT DOCUMENTS

| | | |
|---|---|---|
| WO | 2022/029709 A1 | 2/2022 |
| WO | 2022/044908 A1 | 3/2022 |
| WO | 2022/053270 A1 | 3/2022 |
| WO | 2022/127731 A1 | 6/2022 |
| WO | 2022/147776 A1 | 7/2022 |

OTHER PUBLICATIONS

"3rd Generation Partnership Project; Technical Specification Group Radio Access Network; Evolved Universal Terrestrial Radio Access (E-UTRA) and NR; Multi-connectivity; Stage 2 (Release 17)", 3GPP TS 37.340, V17.0.0, Mar. 2022, pp. 1-110.

"3rd Generation Partnership Project; Technical Specification Group Radio Access Network; NG-RAN; Xn application protocol (XnAP) (Release 17)", 3GPP TS 38.423, V17.1.0, Jun. 2022, pp. 1-613.

"Revised WID on enhancement of data collection for SON/MDT in NR and EN-DC", 3GPP TSG RAN meeting #88-e, RP-201281, Agenda: 9.10.14, CMCC, Jun. 26-Jul. 3, 2020, 5 pages.

"Revised WID: Further enhancement of data collection for SON (Self-Organising Networks)/MDT (Minimization of Drive Tests) in NR standalone and MR-DC (Multi-Radio Dual Connectivity)", 3GPP TSG RAN meeting #96, RP-221825, Agenda: 9.3.3.1, CMCC, Jun. 6-9, 2022, 7 pages.

"3rd Generation Partnership Project; Technical Specification Group Radio Access Network; NR; Radio Resource Control (RRC) protocol specification (Release 17)", 3GPP TS 38.331, V17.0.0, Mar. 2022, pp. 1-1221.

"Msc-generator", Sourceforge, Retrieved on Oct. 3, 2023, Webpage available at : https://sourceforge.net/projects/msc-generator/.

"CB: # 1005_SONMDT_SNChangeFail—Summary of email discussion", 3GPP TSG-RAN WG3 #111-e, R3-210993, Agenda: 10.2.1.6, Samsung, Jan. 25-Feb. 4, 2021, 6 pages.

"IEEE 802.11", Wikipedia, Retrieved on Oct. 3, 2023, Webpage available at : https://en.wikipedia.org/wiki/IEEE_802.11.

Search Report received for corresponding United Kingdom Patent Application No. 2214099.0, dated Mar. 14, 2023, 3 pages.

Extended European Search Report received for corresponding European Patent Application No. 23197560.8, dated Feb. 27, 2024, 13 pages.

"Discussion on successful PSCell change report", 3GPP TSG-RAN WG2 #119 electronic, R2-2207909, Agenda: 8.13.3, NEC, Aug. 17-26, 2022, 2 pages.

"SON/MDT enhancements for dual connectivity scenarios", 3GPP TSG-RAN WG2 Meting #119-e, R2-2208572, Agenda: 8.13.3, Samsung, Aug. 17-29, 2022, 4 pages.

"[TP to 38.423, SON] Configuration coordination for the successful PSCell change report", 3GPP TSG-RAN WG3 Meeting #117-bis-e, R3-225393, Agenda: 10.2.1, Nokia, Oct. 10-18, 2022, 14 pages.

* cited by examiner

500

510

OBTAIN INFORMATION ASSOCIATED WITH SPCR

520

DETERMINE CONFIGURATION OF SPCR BASED AT LEAST PARTLY ON INFORMATION

600

610

TRANSMIT INFORMATION ASSOCIATED WITH SPCR

CONFIGURATION OF SUCCESSFUL PRIMARY SECONDARY CELL CHANGE REPORT

RELATED APPLICATION

This application claims priority from, and the benefit of, Great Britain Application No. 2214099.0, filed on Sep. 27, 2022, the contents of which is incorporated herein by reference in its entirety.

FIELD

Embodiments of the present disclosure generally relate to the field of telecommunication and in particular to devices, methods, apparatuses and computer readable storage media of a configuration of successful primary secondary cell (PSCell) change report.

BACKGROUND

The 3rd Generation Partnership Project (3GPP) has specified data collection enhancements in New Radio (NR) for Self-organizing Networks (SON)/Minimization of Drive Tests (MDT), which may refer to the support of data collection for SON features, involving coverage and capacity optimization, inter-system inter-RAT energy saving, inter-system load balancing, 2-step Random Access Channel (RACH) optimization, mobility enhancement optimization, and Physical Cell Identification (PCI) selection, successful handover reports, history information in E-UTRA NR Dual connectivity (EN-DC) of User Equipment (UE), load balancing enhancement, RACH optimization and mobility robustness optimization (MRO) for secondary node (SN) change failure.

SUMMARY

In general, example embodiments of the present disclosure provide a solution of a configuration of successful PSCell change report.

In a first aspect, there is provided an apparatus. The apparatus comprises at least one processor; and at least one memory storing instructions that, when executed by the at least one processor, cause the apparatus at least to obtain, from a network node, information associated with a Successful Primary Secondary Cell Change Report (SPCR); and determine a configuration of the SPCR based at least partly on the information.

In a second aspect, there is provided an apparatus. The apparatus comprises at least one processor; and at least one memory storing instructions that, when executed by the at least one processor, cause the apparatus at least to transmit, to a network node, information associated with a SPCR.

In a third aspect, there is provide a method. The method comprises obtaining, at a first network node and from a second network node, information associated with a SPCR; and determining a configuration of the SPCR based at least partly on the information.

In a fourth aspect, there is provide a method. The method comprises transmitting, from a second network node and to a first network node, information associated with a SPCR.

In a fifth aspect, there is provided an apparatus comprising means for obtaining, from a network node, information associated with a SPCR; and means for determining a configuration of the SPCR based at least partly on the information.

In a sixth aspect, there is provided an apparatus comprising means for transmitting, to a network node, information associated with a SPCR.

In a seventh aspect, there is provided a computer readable medium comprising instructions which, when executed by an apparatus, cause the apparatus to perform at least the following: obtaining, from a network node, information associated with a SPCR; and determining a configuration of the SPCR based at least partly on the information.

In an eighth aspect, there is provided a computer readable medium comprising instructions which, when executed by an apparatus, cause the apparatus to perform at least the following: transmitting, to a network node, information associated with a SPCR.

Other features and advantages of the embodiments of the present disclosure will also be apparent from the following description of specific embodiments when read in conjunction with the accompanying drawings, which illustrate, by way of example, the principles of embodiments of the disclosure.

BRIEF DESCRIPTION OF THE DRAWINGS

Embodiments of the disclosure are presented in the sense of examples and their advantages are explained in greater detail below, with reference to the accompanying drawings.

Throughout the drawings, the same or similar reference numerals may represent the same or similar element.

DETAILED DESCRIPTION

Figure 1:
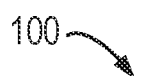
FIG. 1 illustrates an example environment in which example embodiments of the present disclosure may be implemented.
Figure 1:
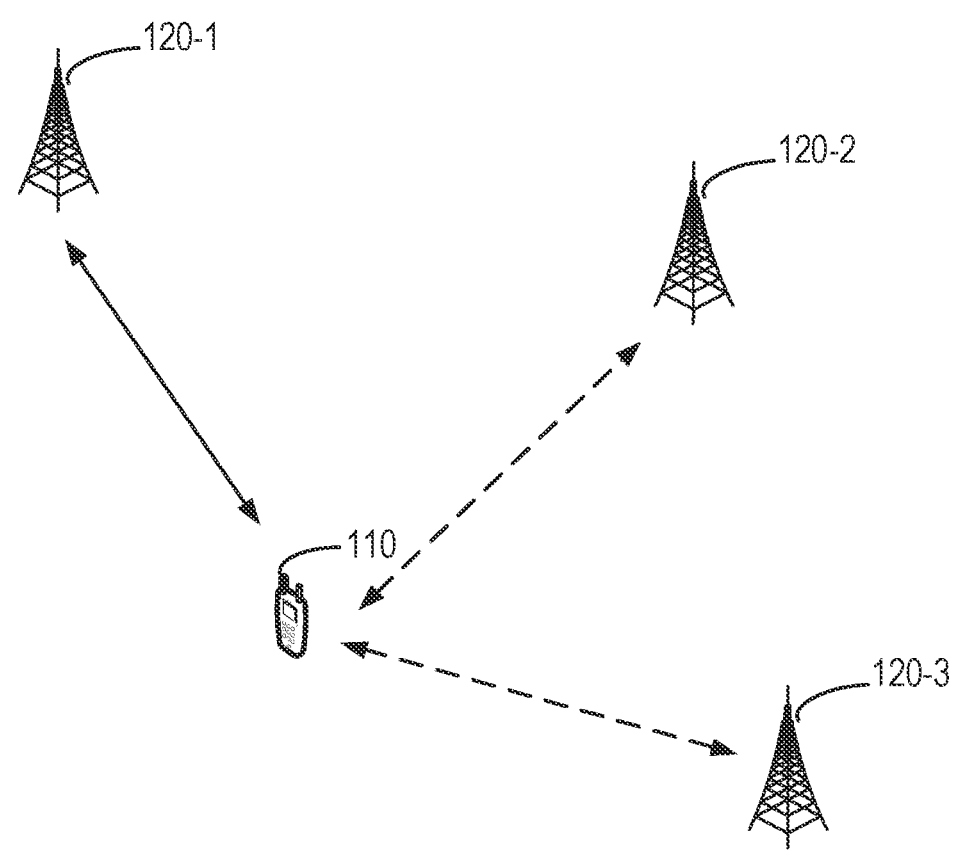

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. Embodiments described herein may be implemented in various manners other than the ones described below.

In the following description and claims, unless defined otherwise, all technical and scientific terms used herein may have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first," "second" and the like may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

As used herein, unless stated explicitly, performing a step "in response to A" does not indicate that the step is performed immediately after "A" occurs and one or more intervening steps may be included.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as New Radio (NR), Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), an NR NB (also referred to as a gNB), a Remote Radio Unit (RRU), a radio header (RH), a remote radio head (RRH), a relay, an Integrated Access and Backhaul (IAB) node, a low power node such as a femto, a pico, a non-terrestrial network (NTN) or non-ground network device such as a satellite network device, a low earth orbit (LEO) satellite and a geosynchronous earth orbit (GEO) satellite, an aircraft network device, and so forth, depending on the applied terminology and technology. In some example embodiments, radio access network (RAN) split architecture includes a Centralized Unit (CU) and a Distributed Unit (DU) at an IAB donor node. An IAB node includes a Mobile Terminal (IAB-MT) part that behaves like a UE toward the parent node, and a DU part of an IAB node behaves like a base station toward the next-hop IAB node.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to a Mobile Termination (MT) part of an IAB node (e.g., a relay node). In the following description, the terms "terminal device", "communication device", "terminal", "user equipment" and "UE" may be used interchangeably.

As used herein, the term "resource," "transmission resource," "resource block," "physical resource block" (PRB), "uplink resource," or "downlink resource" may refer to any resource for performing a communication, for example, a communication between a terminal device and a network device, such as a resource in time domain, a resource in frequency domain, a resource in space domain, a resource in code domain, or any other resource enabling a communication, and the like. In the following, unless explicitly stated, a resource in both frequency domain and time domain will be used as an example of a transmission resource for describing some example embodiments of the present disclosure. It is noted that example embodiments of the present disclosure are equally applicable to other resources in other domains.

FIG. 1 shows an example communication network 100 in which embodiments of the present disclosure may be implemented. As shown in FIG. 1, the communication network 100 may comprise a terminal device 110, which may also be referred to as a UE 110.

The communication network 100 may further comprise multiple network nodes namely a network node 120-1, a network node 120-2 and a network node 120-3. For example, the network node 120-1 may act as a Master Node (MN) serving the UE 110, which may be while the network node 120-2 and the network node 120-3 may act as a Secondary Node (SN). In some scenarios, for example, in a dual connectivity scenario, both the MN and the SN may serve the UE 110.

For example, the network node 120-2 may serve the UE 110 as the SN currently. If a primary secondary cell (PSCell) change procedure for the UE 110 is triggered, for example, the network node 120-3 may serve the UE 110 after the PSCell change is successful. In this situation, the network node 120-2 may also be referred to a source node in the PSCell change procedure and the network node 120-3 may also be referred to a target node in the PSCell change procedure.

It is to be understood that the number of network nodes and terminal devices shown in FIG. 1 is given for the purpose of illustration without suggesting any limitations. The communication network 100 may include any suitable number of network devices and terminal devices.

Hereinafter the network node 120-1 may also be referred to as a first network node and the network device 120-2 or 120-3 may also be referred to as a second network node. The network nodes 120-1, 120-2 and 120-3 may also be referred as a network node 120 collectively. In some example embodiments, links from the network node 120 to the terminal device 110 may be referred to as a downlink (DL), while links from the terminal device 110 to the network node 120 may be referred to as an uplink (UL). In DL, the network node 120 is a transmitting (TX) device (or a transmitter) and the terminal device 110 is a receiving (RX) device (or receiver). In UL, the terminal device 110 is a TX device (or transmitter) and the network node 120 is a RX device (or a receiver).

Communications in the communication environment 100 may be implemented according to any proper communication protocol(s), includes, but not limited to, cellular communication protocols of the first generation (1G), the second generation (2G), the third generation (3G), the fourth generation (4G), the fifth generation (5G), the sixth generation (6G), and the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, includes but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

During a handover (HO) from a cell to another, although the HO may be successful, still there may be outages during the HO. For example, a T310 timer may start but may not expire before HO complete. In this situation, it may be possible to further optimize the timing of the handovers and therefore successful handover report is introduced.

For example, the successful handover report (SHR) may be configured by both a source and a target node (configuring different parts of SHR) during handover. Different parts of SHR may be configured by different nodes and the SHR configuration may be within a handover command. The SHR may be fetched by the target node and forwarded back to the source node, if needed, using UEInformationRequest/ UEInformationResponse. The UE may include the availability of SHR to the network in each complete message sent in RRC procedure, such as RRCReconfigurationComplete, RRCReestablishmentComplete, RRCSetupComplete, RRCResumeComplete message if it has available successful HO report to be reported. The UE may discard the SHR, i.e., release the UE variable VarSuccHO-Report, 48 hours after the SHR is stored.

For example, the UE may only log the SHR if the configuration of the SHR is received during the HO and at least one of the following criteria may be satisfied, for example, a T310 timer of the UE exceeds the configured threshold by the source node, a T312 timer of the UE exceeds the configured threshold by the source node, or a T304 timer of the UE exceeds the configured threshold by the target node.

For example, the content of SHR may include source and target cell IDs of the HO, location information, latest radio link measurements of all measurement IDs available at the time HO is executed for all HO types, a cause that was the trigger for generating the SHR, i.e., t310-cause, t312-cause, t304-cause, latest radio measurement results of the candidate target cells in case of conditional HO, a time elapsed between conditional HO execution towards target cell and corresponding latest configuration received for the selected target cell, a Cell-Radio Network Temporary Identifier (C-RNTI) of target cell or RA-InformationCommon when T304 is above a threshold.

In case of a Multi-RAT Dual Connectivity (MR-DC), a MN may function as a controlling entity that provides control plane connection to the core network and utilize an SN for additional resources to the UE. The Secondary Cell Group (SCG) may refer to a group of serving cells associated with the SN and comprise a PSCell, which is the primary cell of the SCG.

Moreover, both MN and SN may be responsible for SCG mobility, that is, both MN-initiated SN change and SN-initiated SN change with/without MN involvement are possible. In addition, the SN may change the PSCell of the UE without notifying the MN (intra-SN PSCell change without MN involvement) using the dedicated signalling radio bearer between SN and the UE, in case of EN-DC, eNB NR Dual Connectivity (NGEN-DC) and NR-DC. In that case, the MN is not aware of the PSCell change, although it still knows the correct SN that the UE is connected to.

The study on successful PSCell change report, i.e., SPCR, is expected to be further developed based on the features and frameworks for SON/MDT.

As described above, on the one hand, the MN may be responsible for the PSCell changes of the UE. Thus, the MN may be able to configure SPCR to optimize its own PSCell change decisions by collecting statistics for MRO.

Considering a scenario where MN would like to configure SPCR to reduce interruption during inter-SN PSCell change. The requirements of the services that the UE receives enforce that the interruption time shall be less than, e.g., 100 ms, is assumed. If after the reception of PSCell change command, the T310 starts at the UE (e.g., as the cell quality goes below a threshold), but PSCell change is successfully completed before T310 expiry. In this case, the MN would be interested in the interruption time that the UE faced (at least by knowing what percentage of the original T310 timer value was exceeded) and collect statistics on T310 timer value at the time of completion of the PSCell change—similar to SHR for handovers in single-connectivity. Thus, the MN may configure a T310 threshold at the UE within SPCR configuration.

The SHR configuration may include only thresholds to be configured that are percentages of timer values configured at the UE. For instance, the source node of the handover may configure 20% as the T310 threshold in SHR, so that the UE constructs the SHR if its T310 timer goes above ⅕ of the pre-configured T310 value (the T310 timer value may be configured to the UE when the UE establishes the RRC connection to a cell).

However, the MN may not know about the absolute T310 timer configured for the secondary link, as T310 for the SN is configured by the SN itself. Thus, it is infeasible for the MN to configure a proper T310 threshold for the SPCR. Therefore, the MN may not configure a meaningful T310 or T312 threshold in the SPCR configuration, as the MN is unaware of the timer value configured by the SN during connection establishment.

On the other hand, if the PSCell change is initiated by the SN, the SPCR may also be configured by the MN to avoid complicated scenarios. Thus, in a scenario where the SN initiates a PSCell change, the coordination may be needed between SN and MN for the SN to be able to configure SPCR. However, the current information exchange between MN and SN may not enough for proper configuration of SPCR by SN.

Therefore, a mechanism of information coordination between SN and MN for the SPCR configuration is expected the support the case wherein the PSCell is initiated from the MN or the PSCell is initiated from the SN.

According to some example embodiments of the present disclosure, there is provided a solution for a configuration of successful PSCell change report. In this solution, the MN may obtain information associated with SPCR at the SN.

The MN then may determine a configuration of the SPCR at least based on the received information. In this way, successful PSCell change report may be successfully configured by an MN in both cases where the PSCell is initiated from the MN or initiated from the SN.

Example embodiments of the present disclosure will be described in detail below with reference to the accompanying drawings.

Figure 2:
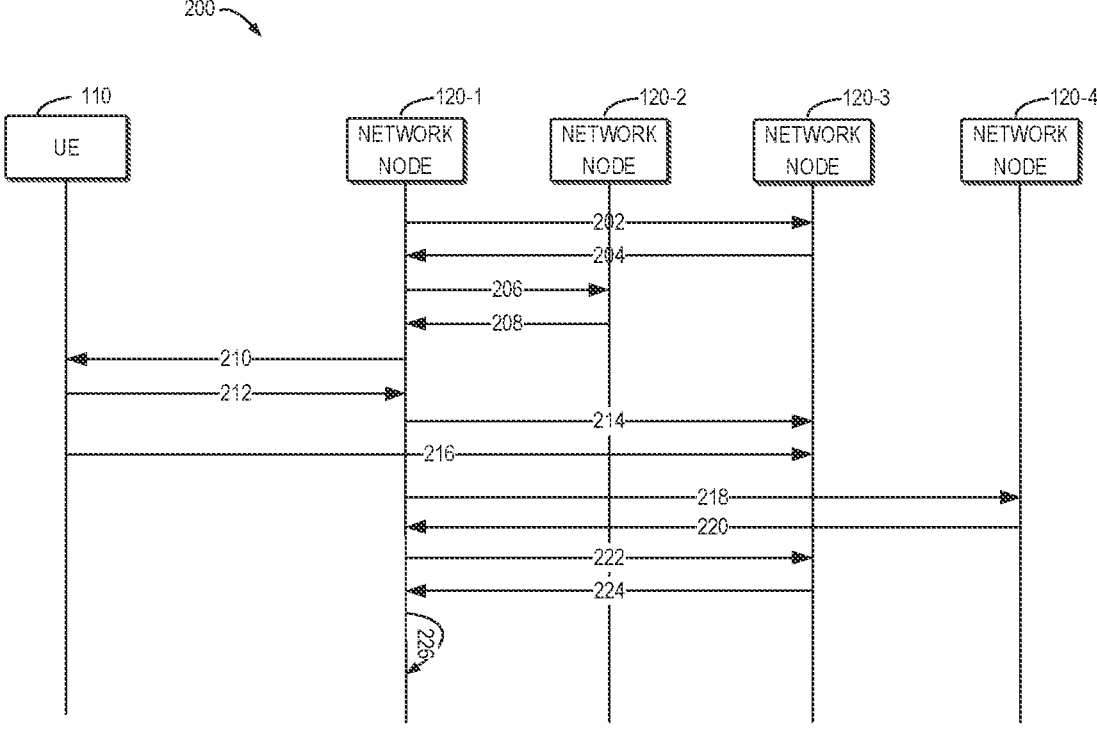
FIG. 2 shows a signaling chart illustrating a process of a configuration of successful PSCell change report according to some example embodiments of the present disclosure.

Reference is now made to FIG. 2, which shows a signaling chart 200 for communication according to some example embodiments of the present disclosure. As shown in FIG. 2, the signaling chart 200 involves the UE 110, the network node 120-1, the network node 120-2, the network node 120-3 and the network node 120-4 (which is not shown in FIG. 1). For the purpose of discussion, reference is made to FIG. 1 to describe the signaling chart 200. In the case shown in FIG. 2, the network node 120-1 may act as a MN, the network node 120-2, the network node 120-3 and the network node 120-4 may act SNs. In some scenarios, the network node 120-2 may act as a source SN and the network node 120-3 may act as a target SN. In some other scenarios, the network node 120-3 may act as a source SN and the network node 120-4 may act a target SN.

As shown in FIG. 2, in this case, the UE 110 is connected to a cell of the network node 120-1 and a cell of the network node 120-2.

If the network node 120-1 determines to initiate inter-SN PSCell change from the cell of the network node 120-2 to a cell of the network node 120-3, e.g., based on measurements reported by the UE 110, the network node 120-1 may transmit 202 a request of information related to SPCR to the network node 120-3, for example, which may be transmitted along with a SN addition request from the network node 120-1 to the network node 120-3.

In some example embodiments, the request of information associated with the SPCR may include a request for the T310/T12 timer that was configured at the UE 110.

Then the network node 120-3 may response 204 the request with the information associated with the SPCR, for example, the T310/T12 timer to be configured at the UE 110.

Alternatively or optionally, the network node 120-3 may response the request with measurement configurations directly, rather than T312 timer values.

Then the network node 120-1 may keep the information associated with the SPCR, for example, the configuration of T310/T312 timer(s), until a new PSCell change from the cell of the network node 120-3 is triggered at the UE 110, or until a new T310/T312 configuration is made by the network node 120-3 and reported to the network node 120-1. It is to be understood that the reported configuration is not used for SPCR configuration for the PSCell change from the network node 120-2 to the network node 120-3, rather the configuration is relevant for any next PSCell change from network node 120-3 to any other future secondary network node, for example, the network node 120-4.

Then a procedure for leading the UE 110 to connect a cell of the network node 120-3 is performed. For example, the network node 120-1 may transmit 206, to the network node 120-2, an SN release request for releasing the connection with the network node 120-2. The network node 120-2 acknowledges 208 the SN release request by sending SN release request ACK. Then the network node 120-1 may transmit 210 a RRCReconfiguration to the UE 110. The UE 110 then may response 212 a RRCReconfiguration Complete message. The network node 120-1 may transmit 214 an SN reconfiguration complete message to the network node 120-3. Then the UE 110 may initiate 216 a random access procedure to the network node 120-3.

If the network node 120-1 decides to initiate inter-SN PSCell change from the cell of the network node 120-3 to a cell of the network node 120-4, e.g., based on measurements reported by the UE 110, a procedure for adding the network node 120-4 and releasing the network node 120-3 is performed.

The network node 120-1 may transmit 218 an SN addition request to the network node 120-4. Then the network node 120-4 may response 220 a SN addition request ACK to the network node 120-1.

The network node 120-1 may transmit 222 an SN release request to the network node 120-3. Then the network node 120-3 may response 224 an SN release request ACK to the network node 120-1.

As the network node 120-1 receives the information associated with the SPCR configured by the network node 120-3 that was informed previously (for example, in the action 204), the network node 120-1 may configure 226 the SPCR, based on the received information associated with the SPCR and by taking the UE 110's service requirements into consideration.

Then a procedure for leading the UE 110 to connect the cell of the network node 120-4 is performed. The RRCConnectionReconfiguration message may include the SPCR configuration.

In this scenario, after the UE 110 connects to the network node 120-3, the network node 120-3 may decide to change the information associated with the SPCR, such as the T310/T312 configuration(s). In that case, the network node 120-1 is to be notified about the newly configured T310/T312 value(s) to the UE 110. The notification, for example, may be performed within SN Modification Request ACK message in case of MN-initiated SN modification or SN Modification Required message in SN-initiated SN modification.

Figure 3:
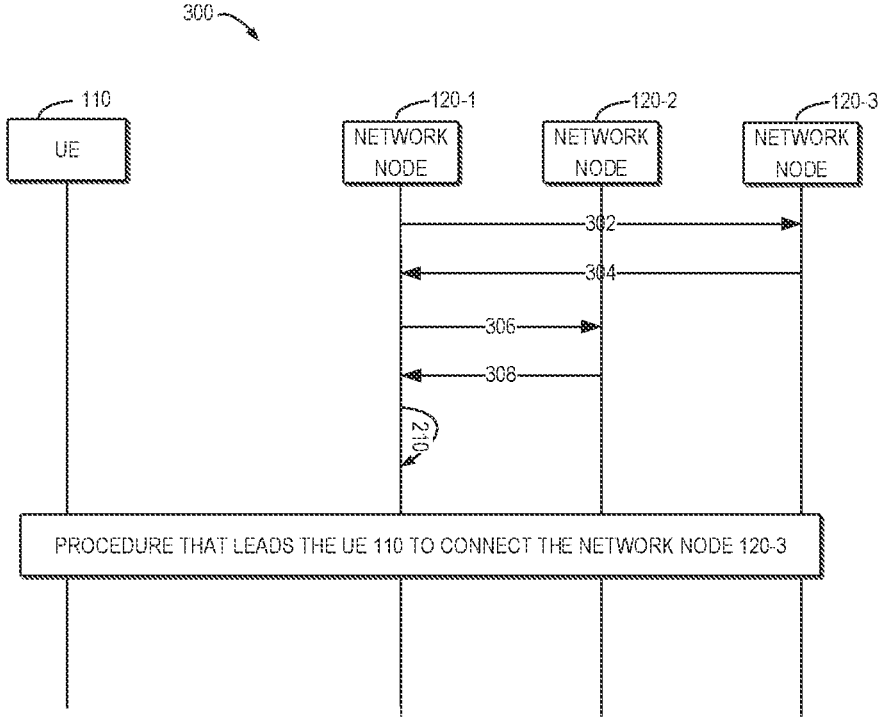
FIG. 3 shows a signaling chart illustrating a process of a configuration of successful PSCell change report according to some example embodiments of the present disclosure.

Reference is now made to FIG. 3, which shows a signaling chart 300 for communication according to some example embodiments of the present disclosure. As shown in FIG. 3, the signaling chart 300 involves the UE 110, the network node 120-1, the network node 120-2 and the network node 120-3. For the purpose of discussion, reference is made to FIG. 1 to describe the signaling chart 300. In the embodiment shown in FIG. 3, the network node 120-1 may act as a MN, the network node 120-2 and the network node 120-3 may act SNs. In some scenarios, the network node 120-2 may act as a source SN and the network node 120-3 may act as a target SN.

As shown in FIG. 3, in this case, the UE 110 is connected to a cell of the network node 120-1 and a cell of the network node 120-2.

If the network node 120-1 determines to initiate inter-SN PSCell change from the cell of the network node 120-2 to a cell of the network node 120-3, e.g., based on measurements reported by the UE 110, the network node 120-1 may transmit 302 a SN addition request to the network node 120-3. The network node 120-3 may acknowledge 304 the SN addition by sending SN Addition Request ACK message.

The network node 120-1 may transmit 306, a request of information related to SPCR to the network node 120-2, for example, which may be transmitted along with a SN release request for releasing the connection with the network node 120-2.

In some example embodiments, the request of the information associated with the SPCR may include a request for the T310/T12 timer that was configured at the UE 110.

In some example embodiments, the request regarding T312 timer value may also include the target PSCell ID for the SN to report the corresponding T312 timer value.

Then the network node 120-1 may respond 308 the information associated with the SPCR along with the SN release request ACK to the network node 120-1, for example, which may include the latest T310 timer value that was configured. The network node 120-2 may include configured T312 timer values and which cells they relate to. In other embodiments, the network node 120-1 may directly include measurement configurations, rather than T312 timer values. If the target PSCell ID is sent by the network node 120-1, network node 120-3 may only include information (such as the T312 timer value or measurement configuration) corresponding to that target PSCell.

As the network node 120-1 knows the information associated with the SPCR from the network node 120-2 that was informed previously (for example, in the action 308), the network node 120-1 may configure 210 SPCR, based on the received information associated with the SPCR and by taking the UE's service requirements into consideration.

Then a procedure that leads the UE 110 to connect the cell of the network node 120-3 is performed.

With the solution described above, successful PSCell change report may be successfully configured by an MN in a case where the PSCell change is initiated from the MN.

Figure 4:
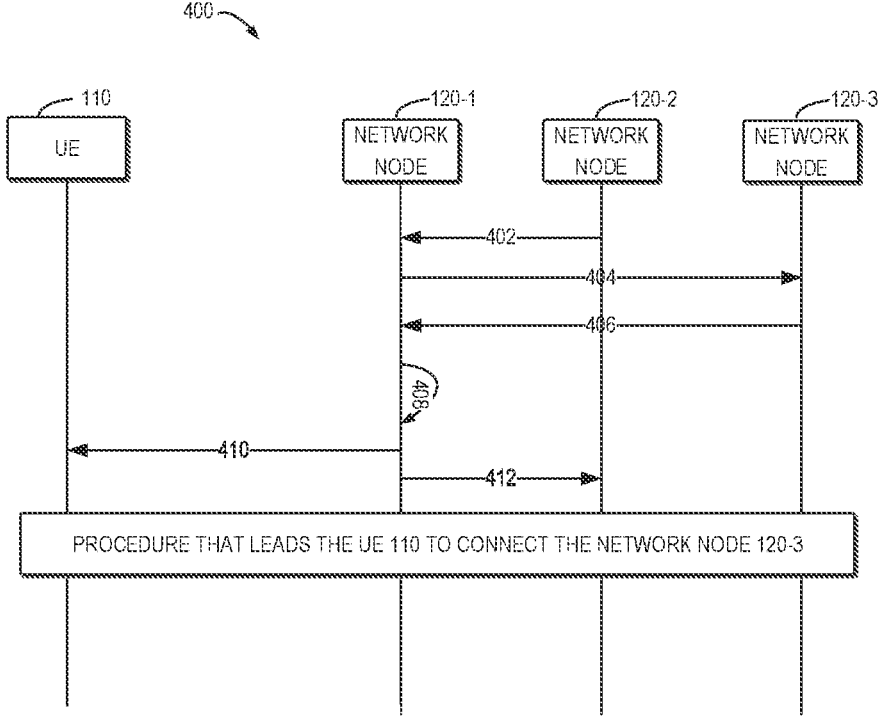
FIG. 4 shows a signaling chart illustrating a process of a configuration of successful PSCell change report according to some example embodiments of the present disclosure.

Reference is now made to FIG. 4, which shows a signaling chart 400 for communication according to some example embodiments of the present disclosure. As shown in FIG. 4, the signaling chart 400 involves the UE 110, the network node 120-1, the network node 120-2 and the network node 120-3. For the purpose of discussion, reference is made to FIG. 1 to describe the signaling chart 400. In the embodiment shown in FIG. 3, the network node 120-1 may act as an MN, the network node 120-2 and the network node 120-3 may act SNs. In some scenarios, the network node 120-2 may act as a source SN and the network node 120-3 may act as a target SN.

As shown in FIG. 4, in this case, the UE 110 is connected to a cell of the network node 120-1 and a cell of the network node 120-2.

If the network node 120-2 determines to initiate inter-SN PSCell change from the cell of the network node 120-2 to a cell of the network node 120-3, e.g., based on measurements reported by the UE 110, the network node 120-2 may transmit 402 information related to SPCR to the network node 120-1, for example, which may be transmitted along with a SN Change Required message from the network node 120-2 to the network node 120-1.

In some example embodiments, the information related to SPCR may include threshold for the T310 and/or T312 preferred by the network node 120-2, or any other possible configuration. The threshold used hereinafter may refer to percentages of timer values. For example, 20% may be configured as the T310 threshold. A SPCR may be generated if its T310 timer goes above ⅕ of the pre-configured T310 value.

Then a procedure to leading the UE 110 to connect to the network node 120-3 is prepared by the network node 120-1. For example, the network node 120-1 may transmit 404 a SN addition request to the network node 120-3. The network node 120-3 may response 406 a SN addition request ACK to the network node 120-1.

The network node 120-1 may configure 408 the SPCR based on the received information related to SPCR, i.e., the preference of the network node 120-2.

After the UE is configured 410 with PSCell change command including SPCR configuration by the network node 120-1, the network node 120-1 may report 412 to the network node 120-2 the actual SPCR configuration made to the UE 110 configured by the network node 120-1, e.g., configured T310 or T312 threshold in SN Change Confirm message.

Otherwise, as the source SN (network node 120-2) may not be aware of what MN (network node 120-1) had actually configured as threshold to the UE 110, and as SPCR reported by the UE 110 later on may not contain the threshold value, the source SN may not make use of the SPCR without knowing the configured threshold.

With the solution described above, successful PSCell change report may be successfully configured by an MN in a case where the PSCell change is initiated from the SN.

In this way, successful PSCell change report may be successfully configured by an MN in both cases where the PSCell is initiated from the MN or initiated from the SN.

Figures 5, 6:
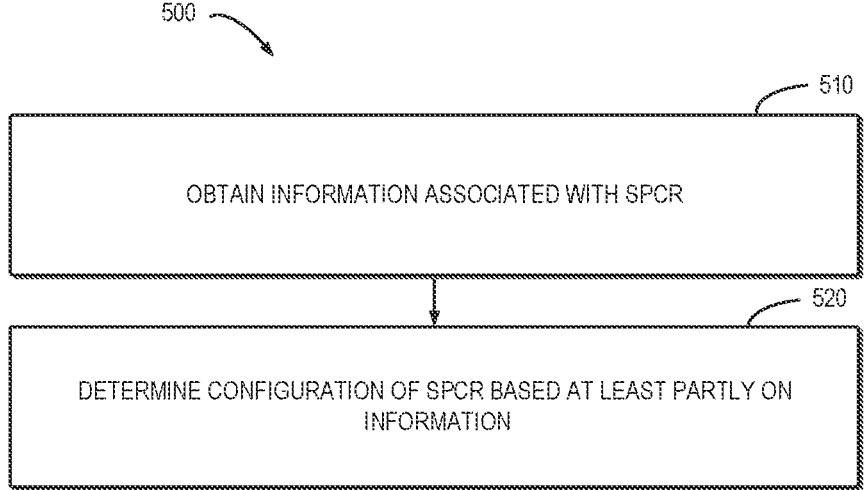
FIG. 5 shows a flowchart of an example method of a configuration of successful PSCell change report according to some example embodiments of the present disclosure.
FIG. 6 shows a flowchart of an example method of a configuration of successful PSCell change report according to some example embodiments of the present disclosure.

FIG. 5 shows a flowchart of an example method 500 of a configuration of successful PSCell change report according to some example embodiments of the present disclosure. The method 500 may be implemented at the first network node 120-1 as shown in FIG. 1. For the purpose of discussion, the method 300 will be described with reference to FIG. 1.

At block 510, the first network node obtains information associated with a SPCR; and At block 520, the first network node determines a configuration of the SPCR based at least partly on the information.

In some example embodiments, the information associated with the SPCR comprises a value of at least one of a T310 timer or a T312 timer configured at the second network node.

In some example embodiments, the information associated with the SPCR may comprise a measurement configuration.

In some example embodiments, the first network node may transmit, to the second network node, a request of the information associated with the SPCR.

In some example embodiments, the request may comprise an identifier of a target primary secondary cell of the primary secondary cell change.

In some example embodiments, the information associated with the SPCR comprises a threshold percentage for the at least one of a T310 timer or a T312 timer preferred by the second the second network node.

In some example embodiments, the first network node may transmit the determined configuration of the SPCR to the second first network node.

In some example embodiments, the first network node comprises a master node for a terminal device and the second network node comprises a secondary node for the terminal device.

FIG. 6 shows a flowchart of an example method 600 of a configuration of successful PSCell change report according to some example embodiments of the present disclosure. The method 600 may be implemented at the second network node 120-2 or the second network node 120-3 as shown in FIG. 1. For the purpose of discussion, the method 600 will be described with reference to FIG. 1.

At block 610, the second network node transmits, to a first network node, information associated with a SPCR.

In some example embodiments, the second network node may receive a request of the information associated with the SPCR is received from the first network node and transmit the information to the first network node.

In some example embodiments, the request may comprise an identifier of a target primary secondary cell of the primary secondary cell change.

In some example embodiments, the information associated with the SPCR comprises a value of at least one of a T310 timer or a T312 timer configured at the second network node.

In some example embodiments, the information associated with the SPCR comprises a threshold percentage for the at least one of a T310 timer or a T312 timer preferred by the second network node.

In some example embodiments, the second network node may receive a configuration of the SPCR determined by the first network node.

In some example embodiments, the first network node comprises a master node for a terminal device and the second network node comprises a secondary node for the terminal device.

In some example embodiments, an apparatus capable of performing the method 500 (for example, implemented at the first network node 120-1) may include means for performing the respective steps of the method 500. The means may be implemented in any suitable form. For example, the means may be implemented in a circuitry or software module.

In some example embodiments, the apparatus comprises means for obtaining information associated with a SPCR; and means for determining a configuration of the SPCR based at least partly on the information.

In some example embodiments, the information associated with the SPCR comprises a value of at least one of a T310 timer or a T312 timer configured at the second network node.

In some example embodiments, the information associated with the SPCR comprises a measurement configuration.

In some example embodiments, the apparatus comprises means for transmitting, to the second network node, a request of the information associated with the SPCR.

In some example embodiments, the request comprises an identifier of a target primary secondary cell of the primary secondary cell change.

In some example embodiments, the information associated with the SPCR comprises a threshold percentage for the at least one of a T310 timer or a T312 timer preferred by the second network node.

In some example embodiments, the apparatus comprises means for transmitting the determined configuration of the SPCR to the second network node.

In some example embodiments, the first network node comprises a master node for a terminal device and the second network node comprises a secondary node for the terminal device.

In some example embodiments, an apparatus capable of performing the method 600 (for example, implemented at the second network node 120-2 or 120-3) may include means for performing the respective steps of the method 600. The means may be implemented in any suitable form. For example, the means may be implemented in a circuitry or software module.

In some example embodiments, the apparatus comprises means for transmitting, to a first network node, information associated with a SPCR.

In some example embodiments, the apparatus comprises means for receiving a request of the information associated with the SPCR is from the first network node, and means for transmitting the information to the first network node.

In some example embodiments, the request comprises an identifier of a target primary secondary cell of the primary secondary cell change.

In some example embodiments, the information associated with the SPCR comprises a value of at least one of a T310 timer or a T312 timer configured at the second network node.

In some example embodiments, the information associated with the SPCR comprises a threshold percentage for the at least one of a T310 timer or a T312 timer preferred by the second network node.

In some example embodiments, the apparatus comprises means for receiving a configuration of the SPCR determined by the first network node.

In some example embodiments, the first network node comprises a master node for a terminal device and the second network node comprises a secondary node for the terminal device.

Figure 7:
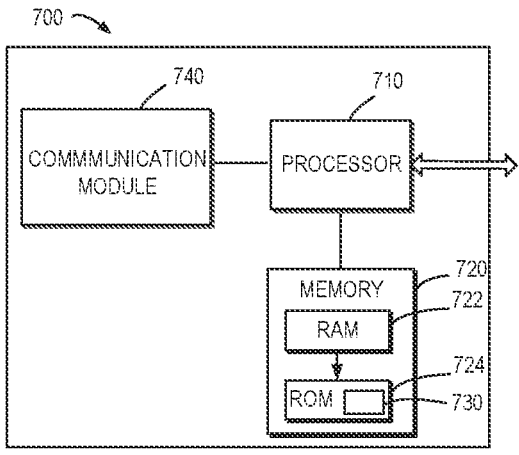
FIG. 7 shows a simplified block diagram of a device that is suitable for implementing example embodiments of the present disclosure.
Figure 8:
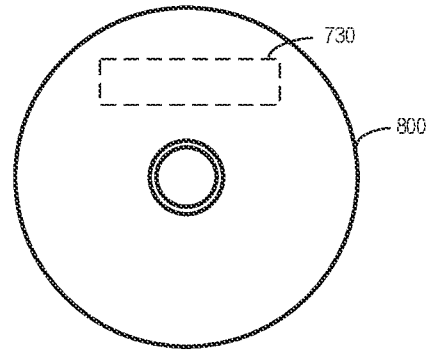
FIG. 8 shows a block diagram of an example computer readable medium in accordance with some embodiments of the present disclosure.

FIG. 7 is a simplified block diagram of a device 700 that is suitable for implementing example embodiments of the present disclosure. The device 700 may be provided to implement a communication device, for example, the first network node 120-1 and the second network node 120-2 or 120-3 as shown in FIG. 1. As shown, the device 700 includes one or more processors 710, one or more memories 720 coupled to the processor 710, and one or more communication modules 740 coupled to the processor 710.

The communication module 740 is for bidirectional communications. The communication module 740 has one or more communication interfaces to facilitate communication with one or more other modules or devices. The communication interfaces may represent any interface that is necessary for communication with other network elements. In some example embodiments, the communication module 740 may include at least one antenna.

The processor 710 may be of any type suitable to the local technical network and may include one or more of the following: general purpose computers, special purpose computers, microprocessors, digital signal processors (DSPs) and processors based on multicore processor architecture, as non-limiting examples. The device 700 may have multiple processors, such as an application specific integrated circuit chip that is slaved in time to a clock which synchronizes the main processor.

The memory 720 may include one or more non-volatile memories and one or more volatile memories. Examples of the non-volatile memories include, but are not limited to, a Read Only Memory (ROM) 724, an electrically programmable read only memory (EPROM), a flash memory, a hard disk, a compact disc (CD), a digital video disk (DVD), an optical disk, a laser disk, and other magnetic storage and/or optical storage. Examples of the volatile memories include, but are not limited to, a random access memory (RAM) 722 and other volatile memories that will not last in the power-down duration.

A computer program 730 includes computer executable instructions that are executed by the associated processor 710. The instructions of the program 730 may include instructions for performing operations/acts of some example embodiments of the present disclosure. The program 730 may be stored in the memory, e.g., the ROM 724. The processor 710 may perform any suitable actions and processing by loading the program 730 into the RAM 722.

The example embodiments of the present disclosure may be implemented by means of the program 730 so that the device 700 may perform any process of the disclosure as discussed with reference to FIG. 2 to FIG. 6. The example embodiments of the present disclosure may also be implemented by hardware or by a combination of software and hardware.

In some example embodiments, the program 730 may be tangibly contained in a computer readable medium which may be included in the device 700 (such as in the memory 720) or other storage devices that are accessible by the device 700. The device 700 may load the program 730 from the computer readable medium to the RAM 722 for execution. In some example embodiments, the computer readable medium may include any types of non-transitory storage medium, such as ROM, EPROM, a flash memory, a hard disk, CD, DVD, and the like. The term "non-transitory," as used herein, is a limitation of the medium itself (i.e., tangible, not a signal) as opposed to a limitation on data storage persistency (e.g., RAM vs. ROM).

FIG. 7 shows an example of the computer readable medium 700 which may be in form of CD, DVD or other optical storage disk. The computer readable medium 800 has the program 730 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

Some example embodiments of the present disclosure also provides at least one computer program product tangibly stored on a computer readable medium, such as a non-transitory computer readable medium. The computer program product includes computer-executable instructions, such as those included in program modules, being executed in a device on a target physical or virtual processor, to carry out any of the methods as described above. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. The program code may be provided to a processor or controller of a general purpose computer, special purpose computer, or other programmable data processing apparatus, such that the program code, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program code or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Unless explicitly stated, certain features that are described in the context of separate embodiments may also be implemented in combination in a single embodiment. Conversely, unless explicitly stated, various features that are described in the context of a single embodiment may also be implemented in a plurality of embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. An apparatus comprising:
at least one processor; and
at least one memory storing instructions that, when executed by the at least one processor, cause the apparatus at least to:
obtain, by a network node operating as a master node for a terminal device, from a second network node operating as a secondary node for the terminal device, information associated with a Successful Primary Secondary Cell Change Report (SPCR), wherein the information comprises (i) a value of a T310 timer configured by the second network node, (ii) a value of a T312 timer configured by the second network node, and (iii) a threshold percentage corresponding to the T310 timer and the T312 timer; and
determine a configuration of the SPCR based at least partly on the information, wherein determining the configuration comprises:
determining a threshold for generation of the SPCR as a percentage of a timer value configured by the second network node, wherein the configuration is for a Primary Secondary Cell change involving the second network node or a subsequent secondary network node; and
setting a threshold for generation of the SPCR as a percentage of a preconfigured timer value at the terminal device, such that the SPCR is generated only when the timer exceeds the percentage threshold prior to expiry.

2. The apparatus of claim 1, wherein the information associated with the SPCR comprises a measurement configuration.

3. The apparatus of claim 2, wherein the apparatus is caused to:
transmit, to the network node, a request of the information associated with the SPCR.

4. The apparatus of claim 3, wherein the request comprises an identifier of a target primary secondary cell of a primary secondary cell change.

5. The apparatus of claim 4, wherein the information associated with the SPCR comprises a threshold percentage for the T310 timer and the T312 timer.

6. The apparatus of claim 1, wherein obtaining the information associated with the SPCR comprises transmitting, to the second network node, a request that includes an identifier of a target Primary Secondary Cell for a Primary Secondary Cell change, and
wherein the apparatus is further caused to:
receive, in response to the request, information corresponding specifically to the target Primary Secondary Cell.

7. The apparatus of claim 6,
wherein the apparatus is further caused to:
transmit, to the second network node after configuring the SPCR, an indication of an actual SPCR configuration applied to the terminal device, including a threshold percentage used for generation of the SPCR.

8. A method comprising:
obtaining, by a first network node operating as a master node for a terminal device and from a second network node operating as a secondary node for the terminal device, information associated with a Successful Primary Secondary Cell Change Report (SPCR), wherein the information comprises (i) a value of a T310 timer configured by the second network node, (ii) a value of a T312 timer configured by the second network node, and (iii) a threshold percentage corresponding to the T310 timer and the T312 timer; and
determining a configuration of the SPCR based at least partly on the information, wherein determining the configuration comprises:
determining a threshold for generation of the SPCR as a percentage of a timer value configured by the second network node, wherein the configuration is for a Primary Secondary Cell change involving the second network node or a subsequent secondary network node; and
setting a threshold for generation of the SPCR as a percentage of a preconfigured timer value at the terminal device, such that the SPCR is generated only when the timer exceeds the percentage threshold prior to expiry.

9. The method of claim 8, wherein obtaining the information associated with the SPCR comprises transmitting, to the second network node, a request that includes an identifier of a target Primary Secondary Cell for a Primary Secondary Cell change, and receiving, in response to the request, information corresponding specifically to the target Primary Secondary Cell.

10. The method of claim 9, further comprising transmitting, to the second network node after configuring the SPCR, an indication of an actual SPCR configuration applied to a terminal device, including a threshold percentage used for generation of the SPCR.

11. The method of claim 10, wherein the information associated with the SPCR further comprises a radio measurement configuration provided by the second network node, and wherein determining the configuration of the SPCR is based on the radio measurement configuration rather than an absolute timer value.

12. The method of claim 11, wherein the information associated with the SPCR obtained from the second network node configures the SPCR for a subsequent Primary Secondary Cell change initiated after the terminal device has connected to the second network node.

13. The method of claim 12, wherein the configuration of the SPCR is included in a radio resource control reconfiguration message transmitted to the terminal device during a Primary Secondary Cell change procedure.

\* \* \* \* \*